(No Model.) 6 Sheets—Sheet 1.

G. F. DIECKMANN.
DYNAMO ELECTRIC MACHINE.

No. 513,459. Patented Jan. 23, 1894.

Witnesses:
Fred Gerlach
A. Adamick

Inventor:
Geo. F. Dieckmann
By [illegible] Fisher
Attorneys.

(No Model.) 6 Sheets—Sheet 2.

G. F. DIECKMANN.
DYNAMO ELECTRIC MACHINE.

No. 513,459. Patented Jan. 23, 1894.

Witnesses:
Fred Gerlach
A. Adamick.

Inventor:
Geo. F. Dieckmann
By Irwin Fisher
Attorneys.

(No Model.)  
6 Sheets—Sheet 3.

G. F. DIECKMANN.
DYNAMO ELECTRIC MACHINE.

No. 513,459. Patented Jan. 23, 1894.

Witnesses:
Fred Gerlach
A. Adamick

Inventor:
Geo. F. Dieckmann
By Louis Fisher
Attorneys.

(No Model.) 6 Sheets—Sheet 4.
G. F. DIECKMANN.
DYNAMO ELECTRIC MACHINE.

No. 513,459. Patented Jan. 23, 1894.

Witnesses:
Fred Gerlach
A. Adamick

Inventor:
George F. Dieckmann
By Price & Fisher
Attorneys (No Model.) 6 Sheets—Sheet 5.

G. F. DIECKMANN.
DYNAMO ELECTRIC MACHINE.

No. 513,459. Patented Jan. 23, 1894.

Witnesses:
Fred Gerlach
A. Adamick

Inventor:
George F. Dieckmann
By Munn Fisher
Attorneys.

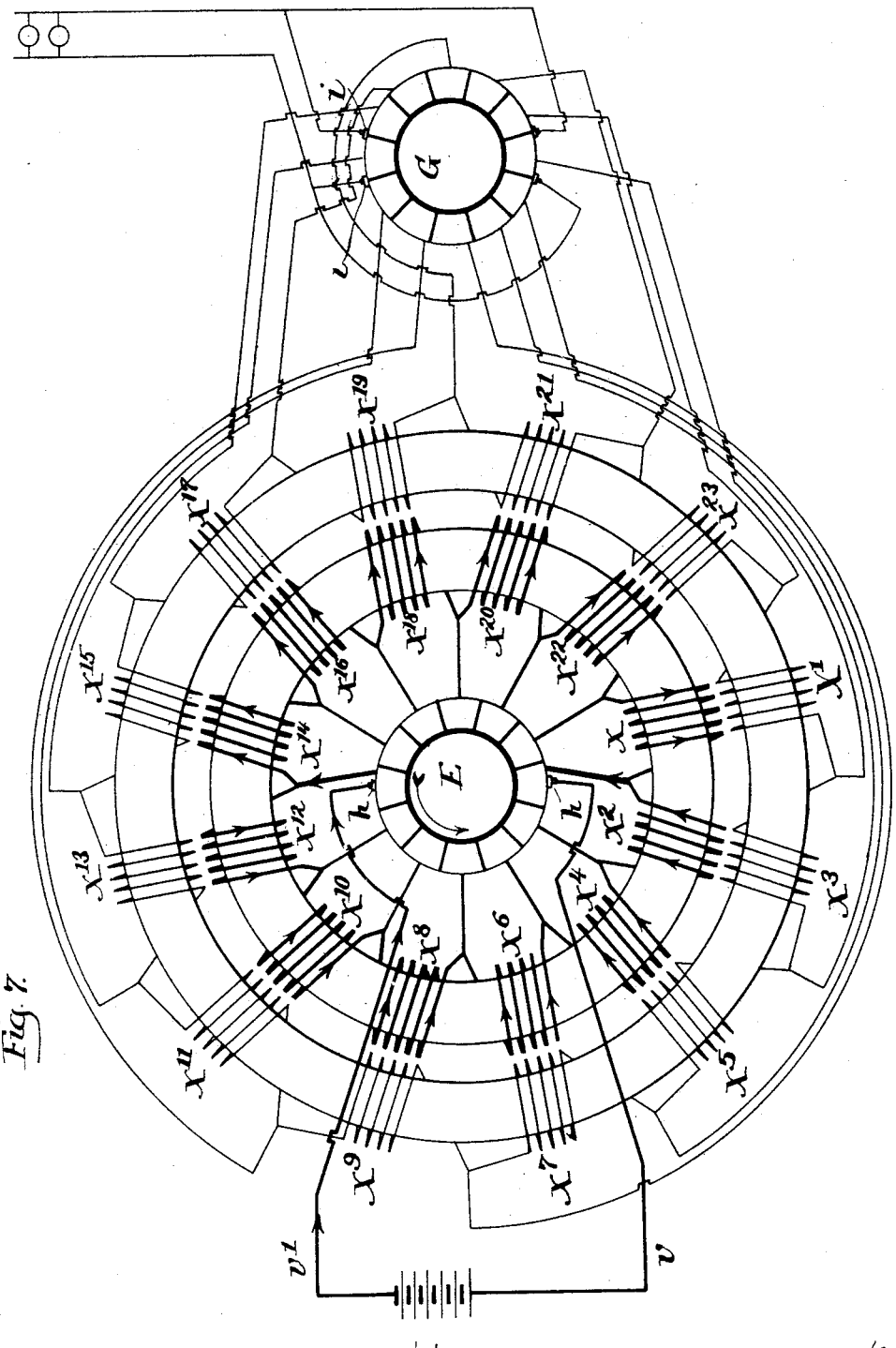

UNITED STATES PATENT OFFICE.

GEORGE F. DIECKMANN, OF CHICAGO, ILLINOIS, ASSIGNOR TO THE DIECKMANN ELECTRICAL COMPANY, OF SAME PLACE.

DYNAMO-ELECTRIC MACHINE.

SPECIFICATION forming part of Letters Patent No. 513,459, dated January 23, 1894.

Application filed December 23, 1892. Renewed December 15, 1893. Serial No. 493,763. (No model.)

*To all whom it may concern:*

Be it known that I, GEORGE F. DIECKMANN, of Chicago, Illinois, have invented certain new and useful Improvements in Dynamo-Electric Machines, of which the following is hereby declared to be a full, clear and exact description, sufficient to enable others skilled in the art to make and use the same.

The invention designs to utilize the electric impulses developed through magnetic induction at the internal circuit in the armature-coil of the familiar dynamo-machine for the production there in a suitable secondary coil of an extra or additional electric current which can be thence distributed for external use. In brief, advantage is taken of the changes which occur in the condition of the ordinary electric flow through the armature-coil to present for its inductive influence, a secondary coil properly arranged and connected for the responsive generation of a supplemental current which may be sent into the external circuit and there be utilized.

The exact nature of the improvement will appear from the description following and be pointed out by claims at the conclusion thereof.

In the accompanying drawings forming part of the specification like parts are designated in like fashion throughout.

Figure 1:
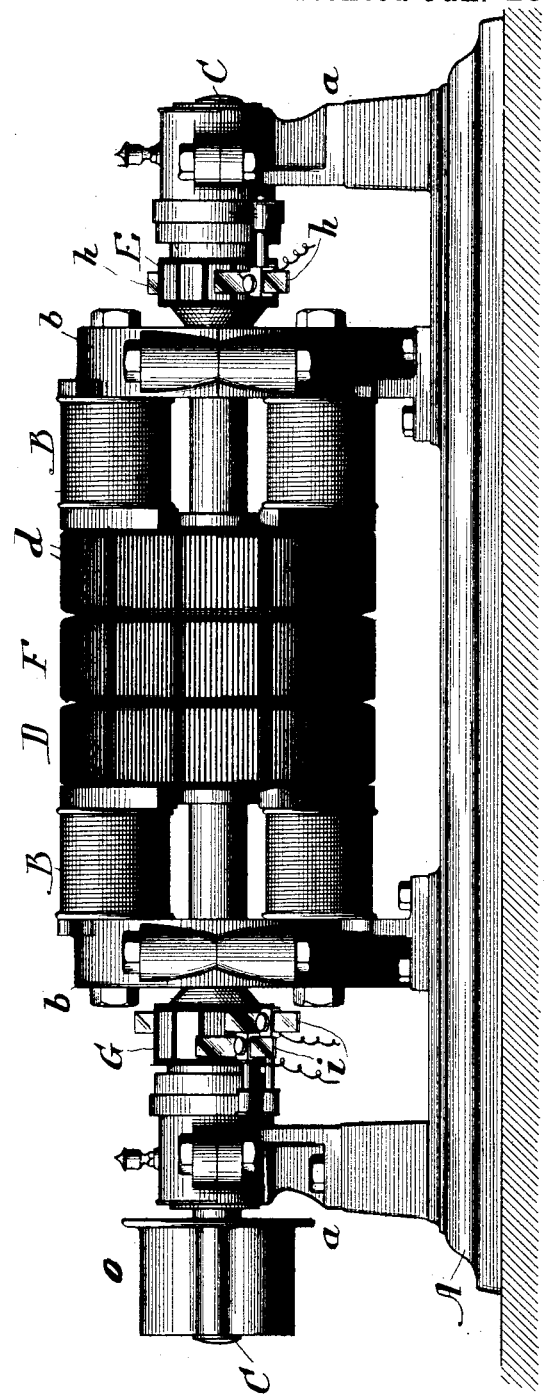
Figure 2:
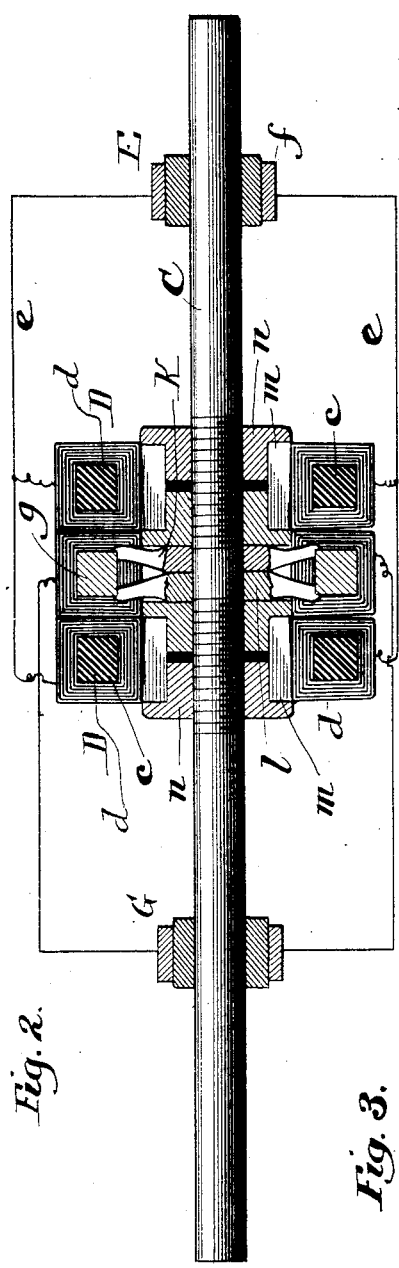
Figure 3:
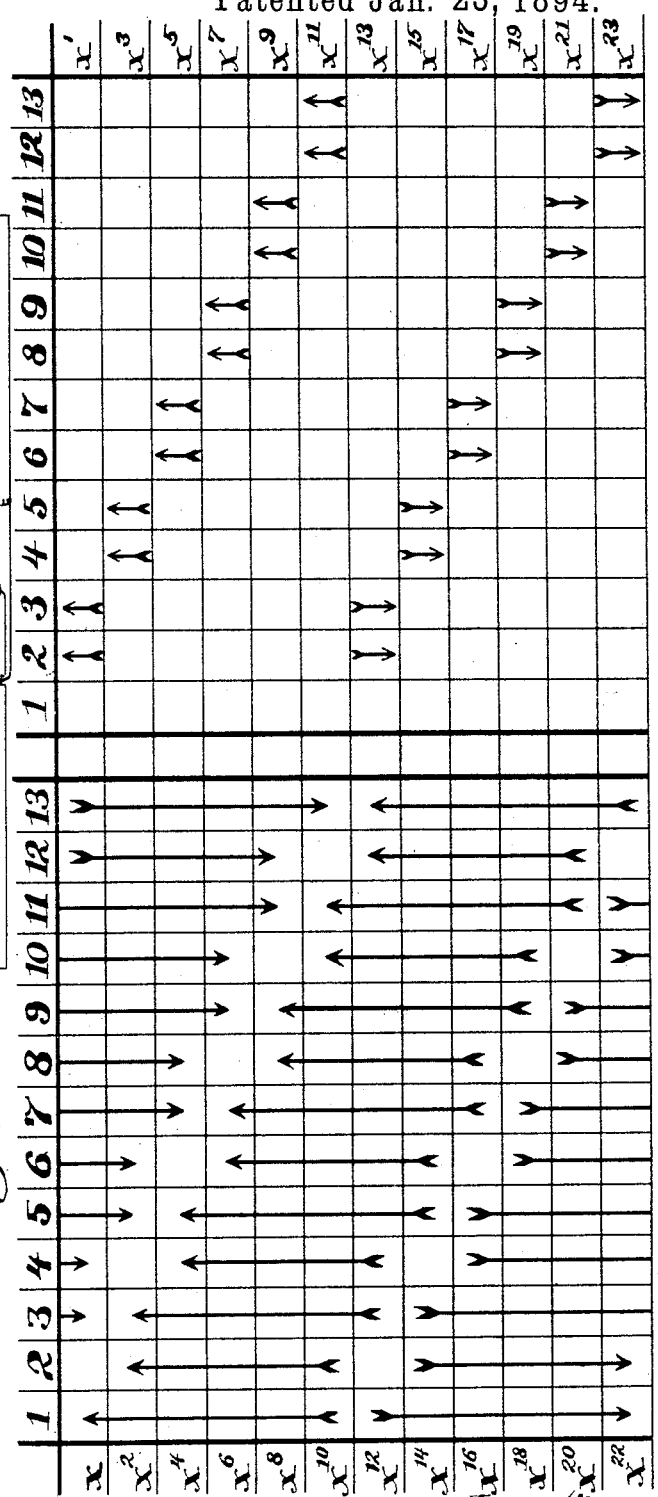

Figure 1 is a view in front elevation of a dynamo-machine constructed in accordance with the invention. Fig. 2 is a detail view of the same in longitudinal section; Fig. 3 an analytic table displaying the electric actions and re-actions at several successive stages during rotation; Figs. 4 to 7 diagrammatic views to show the electric play and re-action between the primary armature and secondary helix at several successive stations.

In the structure selected, the improvement is shown as applied to an ordinary dynamo of the Gramme type, the machine being properly modified as will appear, to adapt the same for the effective generation of the supplemental current.

Upon the bed-plate A are mounted the standards $a$ which afford journal bearings for the revolving shaft C driven by pulley as at $o$. Uprights $b$ secured to the bed-plate constitute a part of the field electro magnets B which extend laterally therefrom and have like poles at their confronting terminals. Each field-magnet B has an armature-ring or keeper D the same consisting of a core $c$ preferably of cast iron or iron-wire overwound by an insulated copper wire or ribbon. The coil $d$ is disposed in familiar fashion about the entire core-ring but is divided into separate sections, these being joined at adjacent ends to neighbor sections so that the whole series is connected in continuous loop. At the section joints a wire $e$ leads thence to the appropriate segment $f$ of the insulated commutator ring E. Like coil-sections of the dual armatures D here shown are connected up to the same commutator segment $f$ by the single wire $e$. Close between the armatures D is located the secondary helix F said helix consisting of a core $g$ preferably of wood or other non-magnetic material over-wound by an insulated wire or ribbon (usually of copper) and divided into sections looped together at adjacent ends, in exact keeping with the respective coil-sections of the armatures D which stand opposite. A separate commutator G for the helix F has its segments electrically joined to the respective loop-wires of adjacent helix-sections. Each commutator E G has as many segments as there are separate sections in the coils of the armature and helix. The brushes $h$ for the armature rings are set as usual at the diameter of commutation. The brushes $i$ for the helix F are in two pairs one pair being located (radially) in near position at the sides of each armature-brush $h$ and distant therefrom the space of one-half a commutator-segment. That is, when brush $h$ is bridging, the helix brush pair $i$ is at mid-length of the adjoining segments. Helix-core $g$ is carried by spokes K extending from the companion hubs $l$, said hubs being keyed to the drive-shaft C. The armatures D are sustained by wedge-blocks $m$ and disks $n$ the latter being threaded to the shaft C so that the armatures are capable of nice adjustment to bring their coil-sections exactly opposite to the corresponding sections of helix F, by which expedient the spires of the armature and helix coils respectively stand substantially in confronting parallel throughout and are thus in position proper for inductive play. On revolving the shaft C it carries with it the two armatures D and helix F together with the commutators E G pertaining thereto.

The magnetic circuit is established as usual between the field-magnets B and the armature or keeper-cores c. As rotation proceeds such current is constantly cut by the spires of the coil-rings D, generating therein through magnetic induction at the north and south fields, simultaneous electric impulses of opposite course which are commutated at the brushes h and appear in external circuit as a flow of single direction. During one-half of its traverse any given coil-section is in the north magnetic field, for instance, and during the other half is in the south field. The commutator brushes h are set at the limits of the field, i. e., the neutral point and the section passes from field to field at the brush contact with its segment. What one brush does for the particular section the other brush does for the opposite (or diametric) section at the same time but in reverse. That is to say, two opposite sections of the armature coil are simultaneously changing their field relation and in consequence their electric condition. But the change is not immediate. For when the brush first contacts with the segment appropriate to the particular section, the brush then spans between such segment and its retreating neighbor. At this bridging position the brush diverts or shunts the electric flow around the section thereby rendering it neutral or in other words breaking the electric flow which before prevailed in the section. Another moment and the brush is in sole contact with the selected segment which means that the corresponding section is now fully established in the new field so that the electric flow is resumed therein but is necessarily in direction the reverse of that distinctive of the section when controlled from the opposite field. Accordingly there has been a break and then a reverse brake of the electric current through the section. Both of which distinct changes will tend to develop derived impulses of like direction in a parallel secondary conductor properly exposed to the inductive play. What occurs in the section at the north field occurs simultaneously in exact counterpart in the opposite (or diametric) section at the south field. The inductive actions at the two fields are (in direction) of exactly opposite character. Advantage is taken of this fact to locate a secondary wire in parallel at each point stated, thereby utilizing the inducing influence of the armature coil-sections as these pass in succession to and from bridging position. Since the derived impulses generated in the secondary conductors at the two fields are simultaneous and opposite, and thus like the impulses existing by magnetic induction in the armature coil, resort is had to similar expedients for forcing out the electrically induced currents so that these may appear in external circuit as a flow of single direction.

Referring to the diagrammatic views (Figs. 4 to 7) one of the armature rings is shown in conventional form surrounded by the secondary helix, like coil-sections of each being displayed in confronting parallel position. The sections at both armature and secondary helix are connected up in continuous loop, each loop wire being separately joined as appears to one of the insulated segments in the commutators E G as the case may be. The opposite brushes for the armature are located as usual at the diameter of commutation while the double pair for the secondary helix, range as shown in radial position at the sides of the armature brushes the distance of one segment apart so that the armature brush is mid-way between. For simplicity, only one armature-ring is exhibited especially since the electric changes in that will stand exactly for the changes in the fellow armature as well.

Although the use of dual armatures in lieu of the single armature ordinarily employed divides the total voltage between each armature, yet it reduces the resistance in same ratio, and doubles the carrying capacity, so that ultimately the Watts out-put remains practically unchanged. The expense of the additional armature is the only objection.

Figure 4:
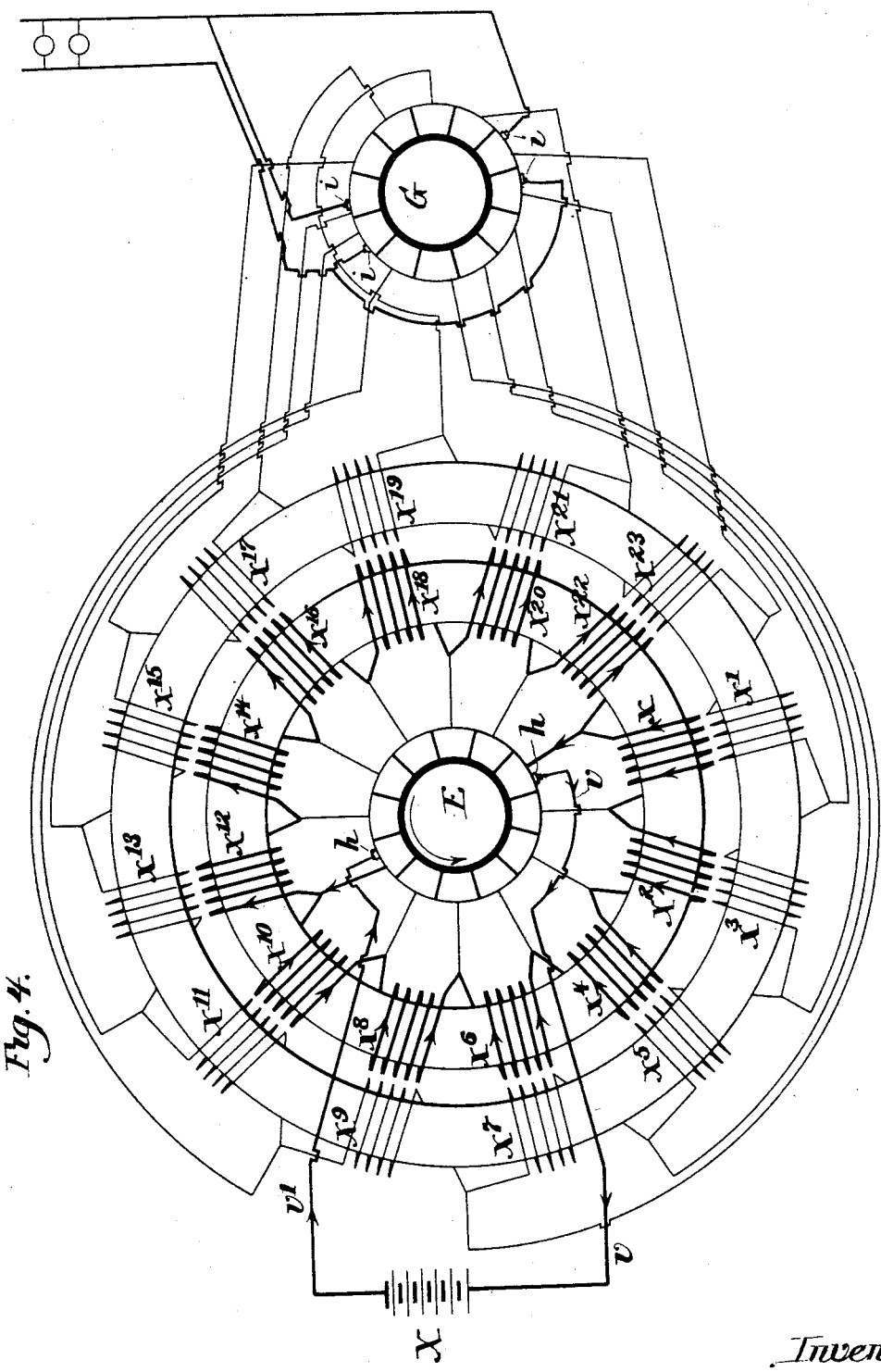
Figure 5:
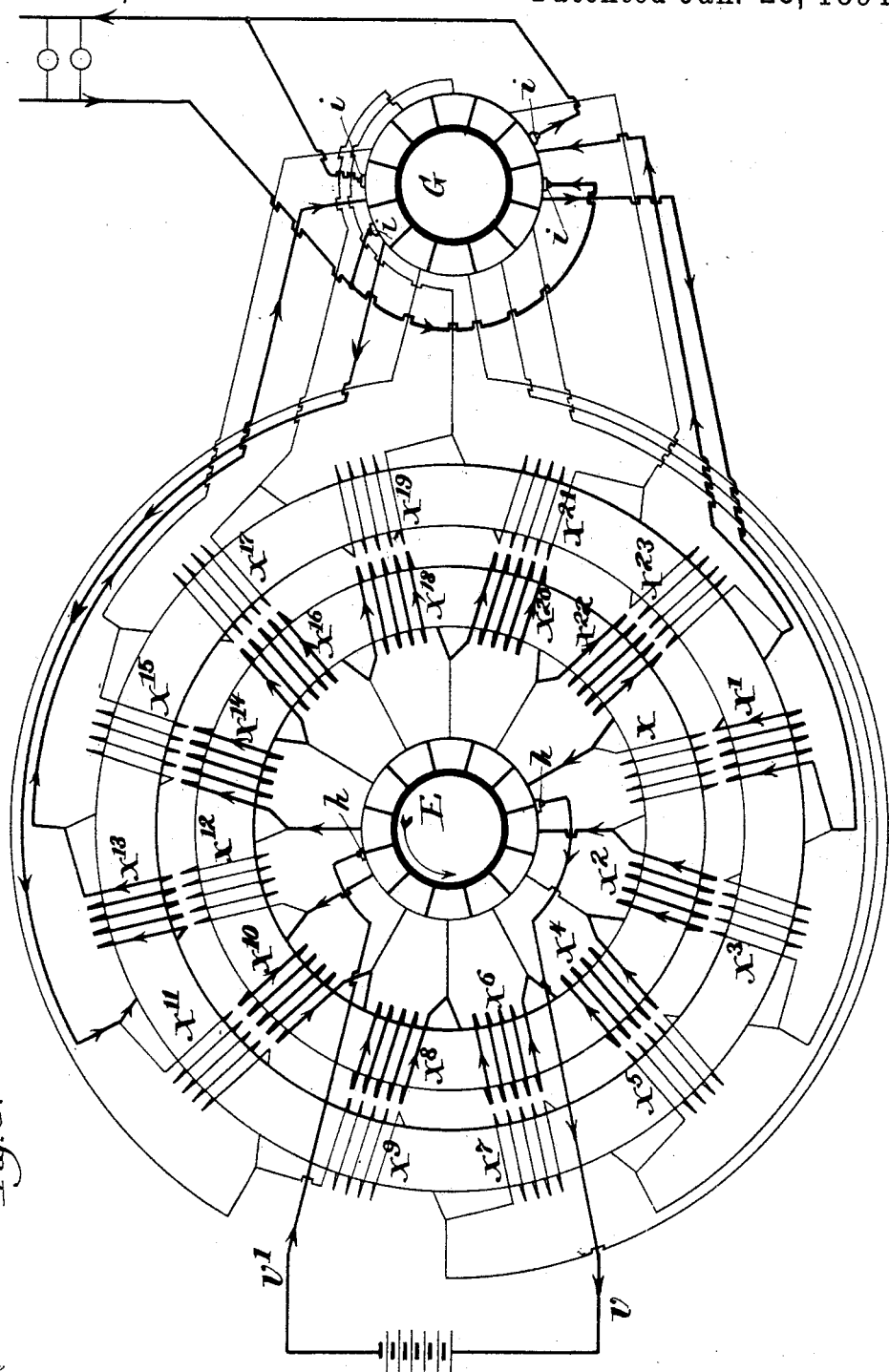
Figure 6:
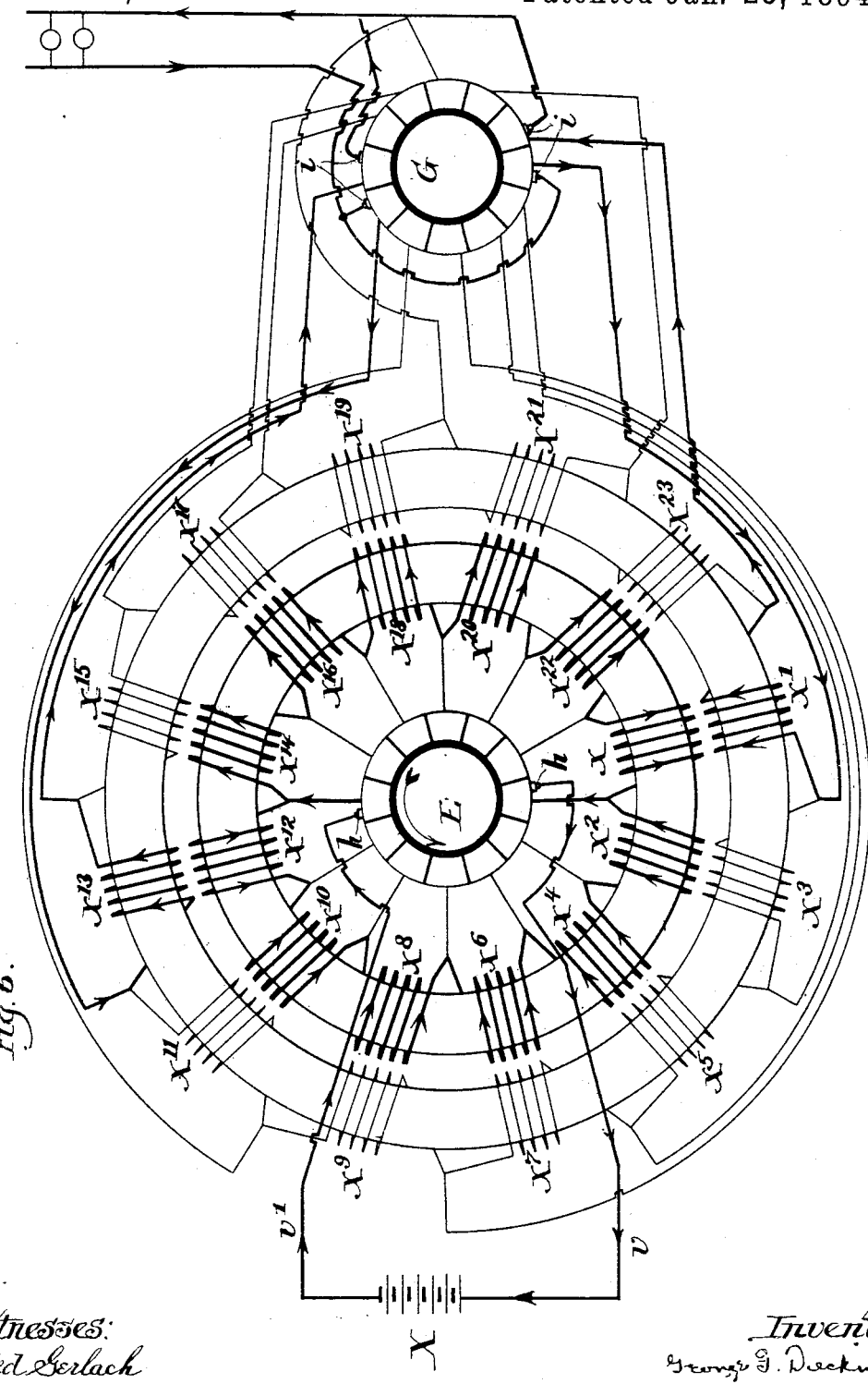

*Station* I.—When the machine parts are in position shown by Fig. 4 the electric current generated in the armature coil by magnetic induction passes as shown through the positive brush h at the diameter of commutation and so by wire v into the external circuit, feeding a storage battery as at X and returning thence by wire v' and negative brush h to the other side of the coil to complete its traverse. At this juncture all of the armature coil-sections are in circuit, the brushes being in contact with single segments only. Accordingly, no inductive action happens and the coil of the secondary helix stands neutral throughout, as shown by its light lines.

*Station* II, (Fig. 5.)—The armature or primary brushes are now at the bridge point and span between adjacent segments, the result being to shunt or cut-out the coil-section $x$ which pertains to the particular segment just brought into brush contact. But the break of the (——>) current at section $x$ renders said section inductively active, and the confronting section $x'$ on the secondary helix is in proper relation to be sensitized thereby. The derived electric impulse is the same in direction (——>) with the course of the current which has just ceased to flow in section $x$. But the opposite (or diametric) section $x^{12}$ on the armature-coil has also been shunted out simultaneously with section $x$ through the other armature-brush. Since the current in section $x^{12}$ is the reverse (<——) of that in section $x$, the derived impulse at confronting helix section $x^{13}$ will be the reverse (<——) of that developed in helix section $x'$. The diagram (Fig. 5) shows at the dark lines, the sensitized helix sections and displays their connections with the respective brush pairs at the commutator. The brushes for the two opposite sections stand at about mid-length of adjacent segments, and it appears that the respective positive and negative brushes in each pair are joined to the same side of the distribution or external circuit. It is clear also that the brush arrangement here proposed while by no means essential is desirable because the sensitized section only is included in circuit thus getting rid of the wasteful resistance which must be encountered if the current were compelled to force its way through one or more additional sections as well.

*Station* III, (Fig. 6.)—The armature brushes now leave the bridge point and are in sole contact with the segments appropriate to sections $x\,\dot{x}^{12}$. Said sections again become active but the direction of the current therein is the reverse of that which prevailed when the bridge was just to be made. The sections have changed their position (electrically) from one field to the other. The inductive influence of section $x$, for example, in passing from neutral to active state tends to develop a secondary impulse of opposite course ($\longrightarrow$) to that of the primary flow ($\longleftarrow$). But the impulse derived thereupon in confronting section $x'$ is the same in direction now, i. e., ($\longrightarrow$) as was the impulse therein at the moment of shunt or break. The helix brush being still upon the proper segment for section $x'$ delivers the additional impulse to the external circuit. The reverse impulse ($\longleftarrow$) derived simultaneously at the opposite (or diametric) section $x^{13}$ passes by its controlling brush to the same side of the line, so that the two impulses force out together as a current of single direction.

*Station* IV.—The armature brushes continue upon the segments to which they attained at Station III. No change in electric condition occurs in the armature sections, and in consequence no derived currents are developed in the secondary helix. The brushes for the secondary helix are now at the bridge point and would operate to destructionly short-circuit the current if any were flowing which is not the case. The secondary brushes clear the bridge before the brushes of the armature attain thereto at the next station. Hence, when the ensuing inductive play arises in sections $x^3\,x^{15}$, through shunt or break of the current in the succeeding armature-sections $x^2\,x^{14}$, the helix brushes are in position to deliver the derived impulses, as before, to the external circuit.

*Station* V.—There are twelve coil-sections shown, and necessarily, twelve commutator-segments, with twelve insulating strips between, constituting twenty-four stations in the circuit. After twelve stations are passed each coil-section shifts its electric condition. Succeeding sections accomplish the shift at successive bridge stations. The change for section $x$ from ($\longrightarrow$ to 0) and (0 to $\longleftarrow$) has been traced and the inductive effects noted. Like changes repeat themselves for the twelve sections in turn, after which section $x$ changes back from ($\longleftarrow$) to ($\longrightarrow$) and persists therein through the other twelve stations. The structure and relations of the parts being symmetric throughout it is unnecessary to further develop the electric actions and re-actions. Enough has been described to demonstrate that in the ordinary dynamo the internal circuit with its pole changes may be efficiently utilized to obtain an extra or additional electric current through proper presentation of a secondary conductor susceptible to the changes in polar status which distinguish the primary current in the dynamo armature-coil. When the machine is used in reverse i. e. as a motor instead of a dynamo electric generator the intermediate secondary helix is still retained and is employed as before to utilize the inductive play of the current changes arising successively in the coil-sections of what have then become the revolving motor rings D. Employed in either way, the inductive activity exists and it is merely necessary to present the parallel helix coil within the field of influence under conditions proper to force the extra current thereby derived into the external circuit, in which view the term "dynamo" as hereinbefore employed is to be taken as equivalent to the term "motor" throughout.

Obviously the details of structure may be changed according to the mechanic's skill, and various types of machine be used without departing from the spirit of the invention which involves generally the presentation of a supplemental wire-coil at the machine under conditions proper to utilize the inductive play arising by changing the electric condition of the armature-helix.

Heretofore, it has been proposed to construct an electric machine wherein the field magnet was provided between its poles with the familiar armature drum or ring core to complete the magnetic circuit. About the armature core was wound first the helix proper and second a secondary coil each having its separate commutator and brushes. Both helix and coil were equally exposed to the cut of the magnetic lines of force. The design was to develop an extra current in the secondary coil by electric induction ensuing upon break or shunt of the main current in the primary helix. The cut of the magnetic flow was attributed to the primary helix only.

The present invention contemplates the removal of the supplemental coil from the field of magnetic force and to this end the coil is separately mounted from the primary helix or drum core which remain as usual fully exposed in the magnetic field. The aim is to derive the extra current in the supplemental coil through pure electric induction by virtue of the proximity and parallelism of the coil and the primary helix. So far as the coil is subjected to the cut of the magnetic flow in common with the helix the influence is plainly detrimental and because of this the separate mounting of the coil apart from the helix, as proposed, avoids the evils which arose when the mounting of the parts named was in unison and upon an armature core common to both.

Having thus described the invention, what I claim as new, and desire to secure by Letters Patent, is—

1. In electric machines, the combination with the field magnet and with its armature-helix of a supplemental coil mounted separately from but located parallel to said helix and inductively influenced thereby, substantially as described.

2. In electric machines, the combination with the field-magnet and with the armature having a helix thereon of a supplemental coil mounted separately from said armature but parallel with the helix thereof and inductively influenced thereby, substantially as described.

3. In electric machines, the combination with the field-magnet and with the armature having a helix thereon and a brush mechanism of a supplemental coil mounted separately from said armature but located parallel with the helix thereof and inductively influenced thereby, and a separate brush mechanism for said supplemental coil to discharge into external circuit the derived electric current generated therein, substantially as described.

4. In electric machines, the combination with the field-magnet and with the revolving armature having a section-helix thereon and a brush-control mechanism to progressively shunt the sections thereof, of a supplemental or secondary revolving section-coil mounted separately from said armature but located parallel with the helix thereof and inductively influenced thereby, and a separate brush-control mechanism for said supplemental coil to discharge into external circuit the derived electric current generated therein, substantially as described.

5. In electric machines, the combination with the field-magnet and with the revolving armature having a loop-coil section helix thereon and a brush-control mechanism to progressively shunt the sections thereof, of a supplemental or secondary revolving loop-section coil mounted separately from said armature but located parallel to the helix thereof and inductively influenced thereby, and a separate brush-control mechanism for said supplemental coil to discharge into external circuit the derived electric current generated therein, substantially as described.

GEORGE F. DIECKMANN.

Witnesses:
JAMES H. PEIRCE,
GEO. P. FISHER, Jr.